(12) United States Patent
Brémont et al.

(10) Patent No.: US 9,133,377 B2
(45) Date of Patent: *Sep. 15, 2015

(54) ADHESIVE POLYURETHANE POWDER CAPABLE OF BEING ACTIVATED BY HEAT

(75) Inventors: Michel Brémont, Gex (FR); Michel Awkal, Saint Louis (FR)

(73) Assignee: A. Raymond Et Cie, Grenoble (FR)

( * ) Notice: Subject to any disclaimer, the term of this patent is extended or adjusted under 35 U.S.C. 154(b) by 208 days.

This patent is subject to a terminal disclaimer.

(21) Appl. No.: 12/783,751

(22) Filed: May 20, 2010

(65) Prior Publication Data

US 2011/0288242 A1 Nov. 24, 2011

(51) Int. Cl.
- C09J 175/04 (2006.01)
- C08G 18/18 (2006.01)
- C08G 18/20 (2006.01)

(52) U.S. Cl.
CPC .......... *C09J 175/04* (2013.01); *C08G 18/1816* (2013.01); *C08G 18/1825* (2013.01); *C08G 18/1841* (2013.01); *C08G 18/2027* (2013.01); *C08G 18/2054* (2013.01); *C08G 18/2063* (2013.01); *C08G 2170/00* (2013.01); *C08G 2170/20* (2013.01)

(58) Field of Classification Search
USPC .......... 528/53, 67, 76, 77, 81, 85, 905, 54, 52
IPC ...... C08G 18/1816,18/1825, 18/1841, 18/2027, C08G 18/2054, 18/2063, 2170/00, 2170/20; C09J 175/04
See application file for complete search history.

(56) References Cited

U.S. PATENT DOCUMENTS

| | | | | |
|---|---|---|---|---|
| 3,036,021 A * | 5/1962 | Trescher et al. | ............... | 521/128 |
| 5,143,944 A * | 9/1992 | Savoca et al. | ................ | 521/129 |
| 5,710,215 A | 1/1998 | Abend | | |
| 6,300,413 B1 * | 10/2001 | Simon et al. | ................... | 525/131 |
| 7,005,476 B1 | 2/2006 | Terfloth et al. | | |
| 7,005,482 B2 | 2/2006 | Guse et al. | | |
| 7,267,878 B2 | 9/2007 | Primke et al. | | |
| 8,501,066 B2 * | 8/2013 | Bremont et al. | .............. | 264/211 |

FOREIGN PATENT DOCUMENTS

| DE | 19955731 A1 * | 5/2001 |
|---|---|---|
| EP | 0922720 A1 | 6/1999 |
| WO | 9325599 A1 | 12/1993 |
| WO | WO 2008/132051 A1 * | 11/2008 |

* cited by examiner

*Primary Examiner* — Rabon Sergent
(74) *Attorney, Agent, or Firm* — LeClairRyan

(57) ABSTRACT

A heat-activable powder adhesive composition for use in bonding a component to a surface such as glass is disclosed. The composition of the disclosed invention includes at least two polymers, at least one solid di- or poly-isocyanate in powder form, and a catalyst. Each of the two polymers has a melting point above 40° C. The two polymers are selected from the group consisting of di-functional polymers and multi-functional polymers. The preferred method of preparing the composition of the disclosed invention includes first forming three parts, including a first melted part comprising the polymers, a second melted part comprising the polymers and a catalyst, and a third part comprising the isocyanate. Once cooled, each of the first and second parts forms solid blocks which are fragmented and sieved. The three dry parts are then brought together to form the adhesive powder of the disclosed invention. The adhesive powder can be pre-applied to the attachment surface of a component to be bonded. The composition does not require either a deactivating agent or a blocking agent for deactivating the isocyanate or the catalyst nor does it require either a deactivated isocyanate or a deactivated catalyst.

5 Claims, 1 Drawing Sheet

ADHESIVE POLYURETHANE POWDER CAPABLE OF BEING ACTIVATED BY HEAT

TECHNICAL FIELD

The disclosed invention relates generally to adhesives for holding an article to a surface such as a glass surface. More particularly, the disclosed invention relates to structural polyurethane powder adhesives which can be applied to a component made of any one of several materials including, metal, glass, ceramics, plastics, wood and composites for attachment to another component such as a glass surface. The powder composition can be activated by heat to achieve adhesion. None of the powder compositions of the disclosed invention requires deactivation or blocking before or during manufacturing. Accordingly, the powder adhesives do not require an agent for deactivation or blocking, regardless of the formulation of the selected powder composition of the disclosed invention.

BACKGROUND OF THE INVENTION

Attachment of a first component to a second component for any of a variety of applications may be made by any of several known methods of fastening, including mechanical or chemical fastening. Mechanical fastening, while often practical and reliable, is not always usable for every application. For example, where a first component is being attached to a second component and it is not desirable or practical to drill into or otherwise modify the second component for mechanical attachment, chemical fastening is the only other alternative. This is the case where, for example, a component is to be attached to a glass surface, the second component. An example of a component-to-glass arrangement may be seen in the automotive industry where a rear view mirror or a metal hinge needs to be attached to a glass surface. Other examples of component-to-glass attachment needs exist such as in home and office construction.

The early challenges faced by those attempting to attach a component to glass using chemical fastening included early partial or complete failure brought about due to heating-cooling cycles and ultraviolet radiation.

While modern day adhesives have generally overcome the failure of the adhesive to hold the component in place over time, problems still remain in terms of difficulty and speed of application, time for setting, and cost. Typical adhesive materials known today are not easy to apply (usually to the component) and the application process takes some time. Once applied to the product, typical setting times are lengthy and are inconsistent with the high speed demands of the modern moving assembly line. Finally, and not inconsequentially, today's component-to-glass assembly and bonding processes using adhesives are expensive due to high material and high logistics costs as well as material waste caused by inefficient and outdated application techniques.

Current component-to-glass adhesive compositions offer concrete advancements in the state of the art, although known compositions suffer from one or more of the drawbacks described above. For example, in U.S. Pat. No. 5,710,215, a method and material mixture for the manufacture of reactive hotmelts is disclosed. That reference teaches the method of mixing a meltable hydroxyl functional or amino functional polymer mix with a powdered or solid surface deactivated poly-isocyanate (or a suspension of such poly-isocyanates) in a low volatility carrier fluid. Other publications (WO9325599 and EP 0922720) propose similar powder adhesives, but require the use of one or more deactivating agents to deactivate the isocyanate.

While providing an advancement in the art of adhesive polyurethane powder, the use of either a deactivating agent or a deactivated isocyanate in such a composition presents a number of disadvantages, including extending bonding time and extending curing time while increasing material cost and, hence, production cost.

As in so many areas of fastener technology, there is room in the art of adhesives for attaching components to glass for an alternative method adhesive composition.

SUMMARY OF THE INVENTION

The present invention provides a heat-activable powder adhesive composition for use in bonding a component to a surface such as glass. The composition of the disclosed invention represents an improvement over the prior art in that it does not require either a deactivating agent or a blocking agent for deactivating isocyanate nor does it require deactivated or blocked isocyanate. In addition, the disclosed composition includes a multifunctional polymer to give high performance to the final bonded system, and a highly reactive catalyst which, because of its high reactivity, may be provided in low concentrations.

In general the disclosed composition includes at least two polymers, at least one solid di- or poly-isocyanate in powder form, and a catalyst. The two polymers each has a melting temperature or a softening temperature above 20° C. Each of the two polymers is selected from the group consisting of di-functional polymers and multi-functional polymers. The at least two polymers are most preferably taken from the group consisting of macrodiols and macropolyols.

The composition may be prepared in a variety of ways. One method, the one part method, is preferably used where the melting temperature is at least 10° C. lower than the cross-linking temperature of the adhesive and is preferably above 30° C. lower (or more) than the cross-linking temperature of the adhesive. In the one part method, di-functional polymers, a multi-functional polymer, an isocyanate and a catalyst are added successively. The combination is heated and melted, following by very fast cooling resulting in the formation of solid blocks. The blocks are fragmented and sieved resulting in an adhesive powder. Other methods of preparing the composition of the disclosed invention include both a two part method and a three part method.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
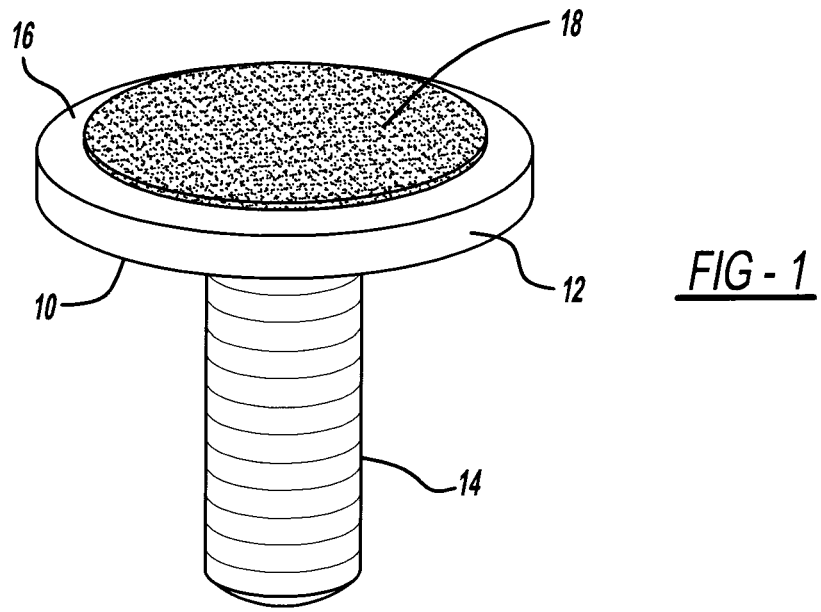
FIG. 1 is a perspective view generally showing the glass-attachment side of a component having the adhesive powder of the disclosed invention provided thereon.

In the following figures, the same reference numerals will be used to refer to the same components. In the following description, various operating parameters and components are described for different constructed embodiments. These specific parameters and components are included as examples and are not meant to be limiting.

The preferred composition of the dry powder adhesive and its preferred method of production are described as follows.

I. Components of the Powder Composition

The composition of the disclosed invention provides a solid, tack-free polyurethane adhesive that is well-suited for the bonding of fasteners. It is intended that the powder composition be pre-applied to the component for later heat-activated adhesion to, for example, vehicle glass.

The heat-activable powder adhesive composition of the disclosed invention includes at least two polymers, at least one solid di- or poly-isocyanate in powder form, and a catalyst.

Polymers

The composition preferably includes two polymers, a di-functional polymer and a multi-functional polymer. Additional polymers may be added without deviating from the spirit and scope of the disclosed invention. The preferred polymers have a melting temperature or a softening temperature above 20° C., so they are generally solid at room temperature. The di-functional polymer contains two functional groups, such as alcohols, that are reactive with isocyanate functional groups. The multi-functional polymer contains several functional groups, such as alcohols, that are reactive with isocyanate functional groups. One of the selected polymers must be capable of cross-linking, and is thus a multi-functional polymer that increases significantly the mechanical strength of the adhesive. Preferably, neither the di-functional polymer nor the multi-functional polymer is deactivated or blocked.

The di-functional polymers comprise macrodiols (such as poly(terepthalic acid-adipic acid-hexane diol) and/or poly(adipic acid-hexane diol)). The di-functional polymer acts as a reactive carrier. When melted, it makes contact between the other ingredients possible and it reacts simultaneously with the isocyanate. The di-functional polymer provides either flexibility or rigidity to the adhesive, depending on the ratio of either rigid or flexible units. A non-limiting example of a suitable di-functional polymer includes Dynacoll 7000™, produced by Evonik Degussa GmbH, Essen, Germany.

The multi-functional polymers comprise macropolyols (such as poly(styrene-allyl alcohol) copolymers, hydroxyl number 80-300). The multi-functional polymer cross-links with the isocyanate and thus increases mechanical properties and aging performance. Non-limiting examples of suitable multi-functional polymers include SAA-100™ and SAA-101™, produced by the Lyondell Chemical Company, Houston, Tex. USA.

Preferably, the two polymers make up a combined amount of between 35% and 95% of the total composition. More preferably, the two polymers make up a combined amount of between 60% and 90% of the total composition. Most preferably, the two polymers make up a combined amount of between 70% and 85% of the total composition.

Isocyanate

The composition preferably includes at least one or both of di-functional molecules and multi-functional molecules. Preferably, but not exclusively, the di-functional molecules are di-isocyanates containing two functional groups and preferably, but not exclusively, the multi-functional molecules are poly-isocyanates containing several isocyanate functional groups. Both are in powder form. Additional di- or poly-isocyanates may be added without deviating from the spirit and scope of the disclosed invention. The isocyanates may be an isocyanate dimer such as 2,4-dioxo-1,3-diazetidine-1,3-bis(methyl-m-phenylene) di-isocyanate. Both of the di-functional and multi-functional polymers are not deactivated or blocked.

The isocyanate polymerizes with the di-functional polymer(s) and cross-links with the multi-functional polymer and thus increases mechanical properties and aging performances.

Preferably, the isocyanate makes up between 2% and 40% of the total composition. More preferably, the isocyanate makes up between 5% and 20% of the total composition. Most preferably, the isocyanate makes up between 5% and 15% of the total composition.

It should be noted that the di-functional molecules do not need to be deactivated or blocked before or during manufacturing. Accordingly, the composition does not require either a deactivated isocyanate or an agent to deactivate or unblock the isocyanate. Thus the composition as described is advantageous over known compositions for time, material and overall cost savings.

The Catalyst

The composition preferably includes a catalyst. Additional catalysts may be added without deviating from the spirit and scope of the disclosed invention. More preferably the catalyst is a tertiary amine. Most preferably the tertiary amine is 3-hydroxyquinuclidine, demonstrated to provide the fast activation. While tertiary catalyst 3-hydroxyquinuclidine is the preferred catalyst, other tertiary amine catalysts may be used. Alternatives include, but are not limited to, 4-(dimethylamino)benzoïc acid, 4,6-dimethyl-2-hydroxy pyrimidine, 4-hydroxyquinazoline, 2,4-quinolinediol, methyliminodiacetic acid, N-benzyliminodiacetic acid, 3-hydroxy-2-quinoxaline carboxylic acid, 2-hydroxyquinoline, 3-acethyl-2-methyl-5H-[1]benzopyrano[2,3-b]pyridin-5-one, 3-quinolinecarboxylic acid, and 8-hydroxy-2-quinoline carboxylic acid. It should be noted that the catalyst does not need to be deactivated or blocked before or during manufacturing. Accordingly, the composition does not require either a deactivated catalyst or an agent to deactivate or unblock the catalyst. Thus the disclosed composition is advantageous over known compositions with respect to time, material and overall cost savings.

The catalyst increases the speed of the reaction as is known in the art. The preferred tertiary amine catalyst is highly reactive and thus may be provided in relatively low concentrations. So efficient is the preferred tertiary amine catalyst that it accelerates bonding time for the disclosed composition from 15 minutes, as in known compositions, to about 5 seconds at the same temperature and with the same heating process. So efficient is the preferred tertiary amine catalyst that it accelerates bonding time for establishment of green strength (the ability of an adhesive to be handled before completely curing) from the 15 minutes of known compositions to less than 10 seconds at the same temperature and with the same heating process as used in applying the known compositions.

Preferably, the catalyst makes up between 0% and 0.5% of the total composition. More preferably, the catalyst makes up between 0.05% and 0.2% of the total composition. Most preferably, the catalyst makes up between 0.05% and 0.15% of the total composition.

Variations of the Composition

To achieve superior adhesion based on the materials to be bonded, modifications may be made to the disclosed powder composition as follows.

(1) To increase the rigidity of the adhesive when bonding a component on metal, the ratio of the rigid units should be increased.

(2) To increase the flexibility of the adhesive when bonding a component to glass, the ratio of the flexible units should be increased.

(3) To decrease the activation temperature when bonding a component to a plastic, polymers with low melting temperatures should be used.

In general, to increase both the overall performance and the resistance to humidity, temperature and global aging performance of the adhesive composition of the disclosed invention, the ratio of the cross-linking sites should be increased.

II. Preparation of the Powder Composition

While the heat-activable powder adhesive composition of the disclosed invention may be prepared in a variety of ways, three methods are disclosed hereafter. All disclosed methods are set forth for illustrative purposes only and are not intended as being limiting. The first method (the three part approach) and the second method (the two part approach) are appropriate for polymers having wide ranges of melting or softening temperatures. Where the melting temperature of the polymers is at least 10° C. lower than the cross-linking temperature of the adhesive and is preferably 30° C. lower (or more) than the cross-linking temperature of the adhesive, the third method of preparing the composition according to the disclosed invention is appropriate. This is the single part approach.

A. First Method of Preparing the Composition—the Three Part Method

In general, the preparation of the composition of the disclosed invention includes first forming three parts. The three parts, once independently prepared in powder form, are combined to form the heat-activable powder adhesive composition of the disclosed invention described above. As the three parts each result in a storable dry powder component, they may be prepared serially (in no particular order) or simultaneously.

Preparation of the First Part

The first part is prepared by combining a quantity of the first polymer with a quantity of the second polymer. The ranges of percent composition for the first part (as well as for the second and third parts) are set forth in Table 1. While identified as being preferred, more preferred, and most preferred ranges, it is to be understood that the percentage quantities set forth in Table 1 are intended as being illustrative and not as being limiting.

After the two polymers are combined, heat is applied in the range of between about 130° C. and 180° C. Once heated and melted (generally above 130° C.), the melt is cooled to room temperature at which point solid blocks are formed. The resulting blocks are fragmented and sieved according to known methods until a first powder results.

Preparation of the Second Part

The second part is prepared by combining a quantity of the first polymer, a quantity of the second polymer, and the catalyst. The preferred, more preferred, and most preferred ranges of percent composition for the second part are set forth in Table 1. After the two polymers and the catalyst are combined heat is applied in the range of between about 130° C. and 180° C. Once heated and melted (generally above 130° C.), the melt is cooled to room temperature at which point solid blocks are formed. The resulting blocks are fragmented and sieved according to known methods until a second powder results.

Preparation of the Third Part

The third part is prepared by providing a quantity of the dry powder isocyanate. The preferred, more preferred, and most preferred ranges of percent composition for the third part are set forth in Table 1.

Mixing of the Three Parts

The heat-activable powder adhesive composition of the disclosed invention is prepared by combining quantities of the first powder, the second powder, and the third powder as set forth in Table 2.

TABLE 2

|  | First Part | Second Part | Third Part |
| --- | --- | --- | --- |
| Preferred range (%) of | 45-90 | 5-35 | 5-35 |
| More preferred range (%) of | 55-90 | 5-20 | 5-20 |
| Most preferred range (%) of | 70-90 | 5-15 | 5-15 |

B. Second Method of Preparing the Composition—the Two Part Method

According to the second method of preparing the composition (the two part approach), a single part is prepared comprising a quantity of the first polymer, a quantity of the second polymer, and the catalyst. The first part (the polymer-containing, isocyanate-free part) is introduced into an extruding machine to produce isocyanate-free, pre-adhesive pellets. The pellets are ground and sieved to form a powder. The isocyanate-free powder is then combined with isocyanate (the second part, also in powder form) for use in forming heat-activable adhesive powder.

TABLE 1

|  | First Part - Catalyst-Free, Isocyanate-Free | | Second Part - Isocyanate-Free | | | Third Part Isocyanate (Plus, |
| --- | --- | --- | --- | --- | --- | --- |
|  | Di-functional polymer | Multi-functional polymer | Di-functional polymer | Multi-functional polymer | Catalyst | if desired, flow-enhancing agents and lubricants) |
| Preferred range (%) of | 45-95 | 2-40 | 45-95 | 2-40 | 0-5 | 95-100 |
| More preferred range (%) of | 60-95 | 5-20 | 60-95 | 5-20 | 0.5-3 | 95-100 |
| Most preferred range (%) of | 70-95 | 7-16 | 85-95 | 8-12 | 0.8-1.2 | 95-100 |

C. Third Method of Preparing the Composition—the One Part Method

As set forth above, if the melting temperature is at least 10° C. lower than the cross-linking temperature of the adhesive and is preferably above 30° C. lower (or more) than the cross-linking temperature of the adhesive or if the B-time of the mixture (measured according to DIN 16 916) at the chosen temperature is higher than the time required to manufacture it, the third method is preferred. According to this method, the manufacturing of the adhesive can also be done by preparing only one part. The preparation is done at the higher melting temperature of the di-functional polymers.

The single part approach is generally utilized according to the third method of preparing the composition of the disclosed invention for low temperature situations. In this method, the following components are added successively: Di-functional polymers, a multi-functional polymer, the isocyanate and then catalyst. Once heated and melted (generally at about 60-80° C. in a vessel), the melt is cooled very fast at which point solid blocks are formed. The resulting blocks are fragmented and sieved according to known methods until a powder results.

Example

A non-limiting example of the formation of the heat-activable adhesive powder of the disclosed invention is set forth hereafter.

Step 1: Formation of the Heat-Activable Composition

A quantity of di-functional polymer was melted. When the quantity of di-functional polymer was completely melted, a quantity of a multi-functional polymer was added to the melted di-functional polymer. When the quantity of multi-functional polymer was melted and distributed in the di-functional polymer, a quantity of isocyanate was then added to the melt. Once the isocyanate was distributed in the melt, a quantity of the catalyst was added and was fully distributed in the combined melt. The percentages of the components were 89.6%, 6%, 4% and 0.4% respectively.

Step 2: Cooling of the Composition

When the catalyst was fully distributed, the reaction was shocked by a rapid drop in temperature.

Step 3: Fragmenting the Composition

The resulting solid blocks were fragmented and sieved to form a second powder.

III. Uses of the Powder Composition

The disclosed composition has a wide variety of potential uses. Particularly, the disclosed composition is primarily but not singularly intended for use to adhere a metal component or a plastic component to vehicle glass. The components to be attached include many types of brackets and fasteners. One such component, a typical stud fastener, is illustrated in FIGS. 1 and 2.

Figure 2:
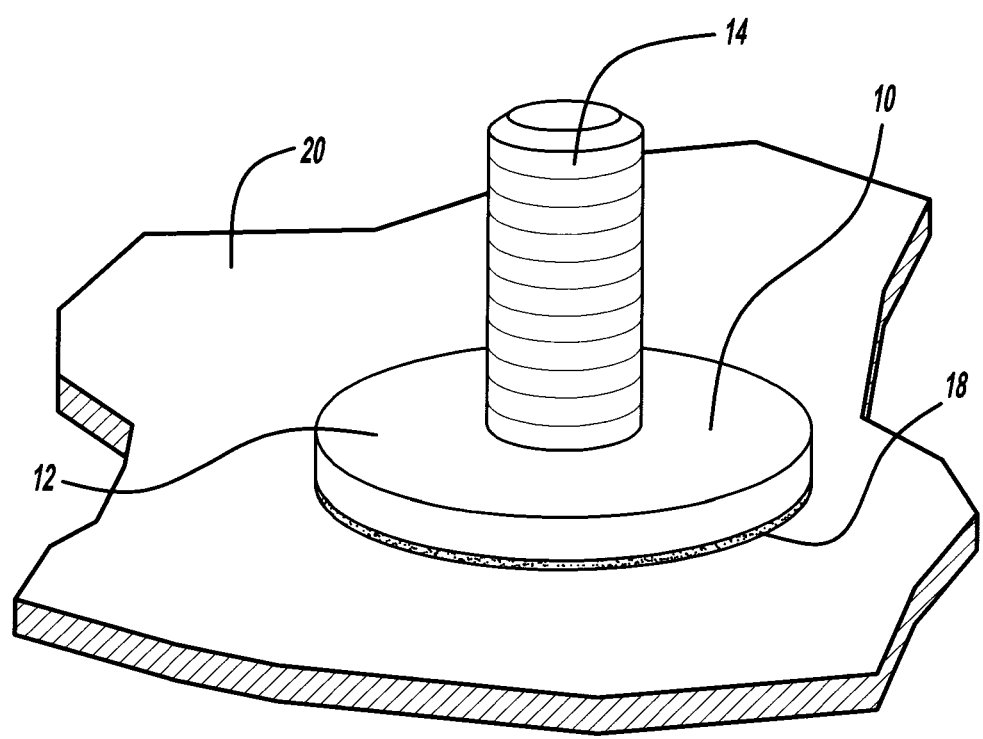
FIG. 2 is a perspective view illustrating the component of FIG. 1 attached to a portion of glass, the attachment being achieved through use of the adhesive composition of the disclosed invention.

With reference to FIG. 1, a ready-to-bond component 10 is shown. The ready-to-bond component 10 includes a body 12 and a threaded stud 14. The body 12 includes a glass-attachment side 16. A quantity of powder adhesive 18 of the disclosed invention is shown in place on the glass-attachment side 16 of the body 12. The quantity of powder adhesive 18, initially in flowable powder form, is attached to the glass-attachment side 16 by any of a variety of known methods, including powder pressing on a component, the component surface temperature being adjusted to between 20° C. and 140° C. depending on the characteristics of the component.

Bonding of the ready-to-bond component 10 by means of the powder adhesive 18 is accomplished by heating of the component itself. Typically but not exclusively the component to be attached is first fitted to and heated by a simple conduction bonding tool (not illustrated). However, any other practical method of heating the ready-to-bond component 10 may be used, including induction heating, infrared heating and hot air heating.

According to the requirements of the powder composition, the bonding tool heats the ready-to-bond component to the full activation point between 80° C. and 200° C. (the activation range), although the powder itself begins to melt between 40° C. and 160° C. (the melting range).

In addition to application of the powder of the disclosed invention on a component to form a ready-to-bond component having a powder coating in part, the powder of the disclosed invention formed by the methods set forth above may also be pressed using a tabletizer to form tablets of different shapes and weights. The formed tablets can be pre-applied to a component in a number of ways. For example, the tablet can be at least partially inserted into a hole formed in the component followed by the application of slight pressure to the tablet to assure attachment. Alternatively, the component may be heated to achieve a surface temperature of between 40° C. and 160° C. after which the component is pressed against the tablet to achieve attachment in a selected location.

With reference to FIG. 2, the heated ready-to-bond component 10 has been attached to a piece of glass 20. A small amount of flowing adhesive 18 may flow to fill up the gap conventionally formed between the glass-attachment side 16 of the body 12 and the glass 20. The total bonding cycle time is ordinarily between about 5 and 120 seconds.

The shape, size and function of the ready-to-bond component 10 shown in FIGS. 1 and 2 is for illustrative purposes only and it is to be understood that any one of several fasteners or brackets may be attached to the glass surface 20 by use of the powder adhesive of the disclosed invention.

Use of the disclosed adhesive avoids the need for mechanical fasteners and thus avoids the necessity of forming holes in the surface to which the component is fastened. By avoiding mechanical fasteners, multiple attachment parts which would otherwise be needed are left out.

While the composition of the disclosed invention has been generally described above as being used to attach a metal component or a plastic component to a glass surface, it should be understood that the disclosed composition may find use as well for bonding objects made of any one of several materials including, without limitation, metal, glass, ceramics, plastics, wood and composites. Furthermore, components and surfaces of like materials may be bonded by the adhesive powder of the disclosed invention.

IV. Characteristics of the Powder Composition

The composition of the disclosed invention offers several advantages over other adhesives and methods of adhesion. For example, the disclosed composition is a solid and tack-free single component adhesive that is suitable for the bonding of a virtually unlimited number of fasteners. Fasteners coated with the disclosed composition can be safely and easily handled at room temperature without fear of either compromising the adhesive characteristics of the composition or reduction in the amount of adhesive on the surface to be bonded. In addition, once attached, the bond created by the composition of the disclosed invention demonstrates a resistance to a broad range of temperatures with a preferred service temperature range of between −80° C. and 120° C. with a peak temperature of about 180° C. and a degradation temperature of more than 200° C.

With respect to the above-referenced FIG. 2, one example (not intended as being limiting) is discussed and is illustrated.

According to the exemplary composition used in bonding the heated ready-to-bond component 10 to the piece of substrate 20, on testing it was found that the composition used achieved green strength in five seconds and achieved a tensile strength of over 3500 N in 15 minutes, thus providing the user with considerable time and cost savings. When tested 24 hours after initial bonding, a tensile strength of 6700 N was obtained. These results exceed known industry strength requirements.

The foregoing discussion discloses and describes exemplary embodiments of the disclosed invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A heat activatable urethane adhesive for bonding a first component to a second component prepared by a process comprising the steps of:
   (a) combining a macrodiol, a macropolyol, an isocyanate, and a catalyst, said catalyst being a tertiary amine selected from the group consisting of 4-(dimethylamino)benzoic acid, 4,6-dimethyl-2-hydroxy pyrimidine, 4-hydroxyquinazoline, 2,4-quinolinediol, methyliminodiacetic acid, N-benzyliminodiacetic acid, 3-hydroxy-2-quinoxaline carboxylic acid, 2-hydroxyquinoline, 3-acetyl-2-methyl-5H-[1]benzopyrano[2,3-b]pyridin-5-one, 3-quinolinecarboxylic acid, and 8-hydroxy-2-quinoline carboxylic acid;
   (b) neither blocking nor deactivating said macrodiol, said macropolyol, said isocyanate, or said catalyst;
   (c) melting the combination;
   (d) allowing the melted combination to cool to a solid; and
   (e) forming a heat activatable adhesive powder from said solid.

2. The heat activatable urethane adhesive of claim 1 wherein said macrodiol has a melting point above 20° C.

3. The heat activatable urethane adhesive of claim 1 wherein said macrodiol is a di-functional polymer.

4. The heat activatable urethane adhesive of claim 1 wherein said macropolyol has a melting point above 20° C.

5. The heat activatable urethane adhesive of claim 1 wherein said macropolyol is a multi-functional polymer.

* * * * *